United States Patent
Cosentino

(10) Patent No.: US 8,302,486 B2
(45) Date of Patent: Nov. 6, 2012

(54) REINFORCED PANEL

(75) Inventor: Enzo Cosentino, Bristol (GB)

(73) Assignee: Airbus Operations Limited, Bristol (GB)

( * ) Notice: Subject to any disclaimer, the term of this patent is extended or adjusted under 35 U.S.C. 154(b) by 572 days.

(21) Appl. No.: 12/451,228

(22) PCT Filed: Apr. 24, 2008

(86) PCT No.: PCT/GB2008/050294
§ 371 (c)(1),
(2), (4) Date: Nov. 2, 2009

(87) PCT Pub. No.: WO2008/139214
PCT Pub. Date: Nov. 20, 2008

(65) Prior Publication Data
US 2010/0126281 A1    May 27, 2010

(30) Foreign Application Priority Data
May 14, 2007   (GB) ................................. 0709118.4

(51) Int. Cl.
*G01G 5/00* (2006.01)
*B64C 1/00* (2006.01)
(52) U.S. Cl. ......................................... 73/802; 244/119
(58) Field of Classification Search .................... 73/802; 244/119, 123.1, 124, 132
See application file for complete search history.

(56) References Cited

U.S. PATENT DOCUMENTS

| | | | |
|---|---|---|---|
| 3,020,986 A * | 2/1962 | Kirk et al. | 52/793.1 |
| 4,411,380 A * | 10/1983 | McWithey et al. | 228/181 |
| 4,425,980 A * | 1/1984 | Miles | 181/208 |
| 4,922,096 A | 5/1990 | Brennan | |
| 6,010,098 A | 1/2000 | Campanile et al. | |
| 6,152,405 A | 11/2000 | Mueller | |
| 6,375,127 B1 | 4/2002 | Appa | |
| 6,648,273 B2 * | 11/2003 | Anast | 244/119 |
| 6,766,984 B1 * | 7/2004 | Ochoa | 244/119 |
| 7,195,203 B2 * | 3/2007 | Livingstone et al. | 244/124 |
| 7,686,251 B2 * | 3/2010 | Tanner et al. | 244/132 |
| 7,721,995 B2 * | 5/2010 | Tanner et al. | 244/132 |
| 2005/0151015 A1 | 7/2005 | Cagle et al. | |

FOREIGN PATENT DOCUMENTS

| | | |
|---|---|---|
| EP | 0 660 429 | 6/1995 |
| EP | 1 714 866 | 10/2006 |
| GB | 2 327 927 | 2/1999 |
| RU | 2 112 698 | 6/1998 |
| WO | WO 2004/108525 | 12/2004 |

OTHER PUBLICATIONS

Search Report for GB 0709118.4 dated Sep. 1, 2007.

(Continued)

*Primary Examiner* — Jewel V Thompson
(74) *Attorney, Agent, or Firm* — Nixon & Vanderhye P.C.

(57) ABSTRACT

A reinforced panel (1) comprising: a composite skin (2); a plurality of stringers (3, 4) bonded to the skin; and one or more strain actuators (5), each positioned between an adjacent pair of stringers. A load is applied to the panel in the plane of the skin, and a local strain is applied to the skin by the strain actuators when the compressive load exceeds a predetermined threshold. This causes the skin to buckle and reduce interface stresses between the skin and the stringers.

16 Claims, 5 Drawing Sheets

OTHER PUBLICATIONS

International Search Report for PCT/GB2008/050294 mailed Jul. 4, 2008.

Written Opinion for PCT/GB2008/050294 mailed Jul. 4, 2008.

Mattioni et al., "The application of residual stress tailoring of snap-through composites for variable sweep wings", *American Institute of Aeronautics and Astronautics*, 2006, 12 pages.

Consentino, "Smart Unstable Structures", Airbus, Nov. 30, 2006, pp. 1-13.

Bowen et al., "Bi-stable composites with piezoelectric actuators for shape change", *Key Engineering Materials*, vols. 334-335, 2007, pp. 1109-1112.

English translation of Russian Examination Report dated Mar. 29, 2012 in RU 2009144035/11.

* cited by examiner

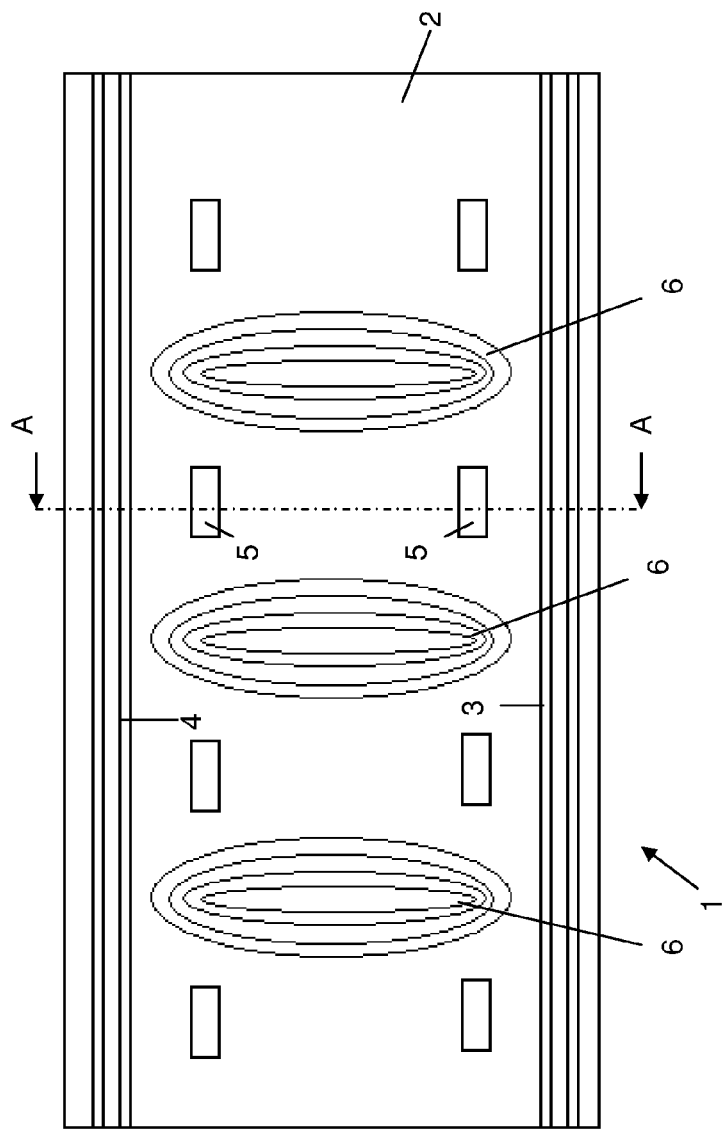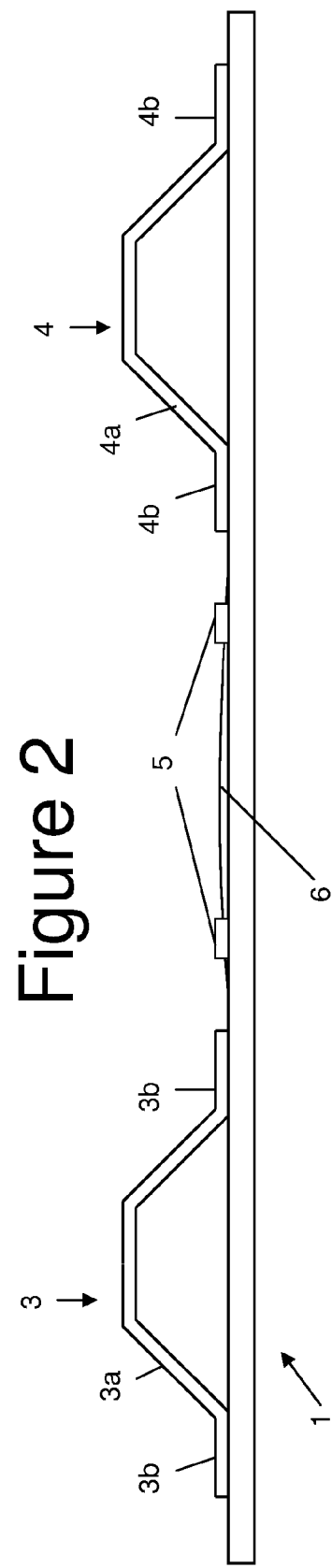

REINFORCED PANEL

This application is the U.S. national phase of International Application No. PCT/GB2008/050294 filed 24 Apr. 2008 which designated the U.S. and claims priority to British Patent Application No. 0709118.4 filed 14 May 2007, the entire contents of each of which are hereby incorporated by reference.

FIELD OF THE INVENTION

The present invention relates to a reinforced panel comprising a composite skin; and a plurality of stringers bonded to the skin. The invention also relates to a method of buckling such a reinforced panel.

BACKGROUND OF THE INVENTION

Despite their high level of performance in specific areas, such as weight, durability and through-life costs, composites are not widely accepted in primary structures. This is mostly due to a reduced understanding of the failure mechanisms and of their behaviour when damaged. This widespread lack of knowledge and know-how often leads to over sized structures, which are in contrast with the lightweight philosophy characterizing all the new design solutions.

Buckling still represents one of the most controversial issues of reinforced panel design. It is well known that composite stiffened panels can carry in plane loads higher than the buckling load without any failure. Unfortunately, the complexity and expensiveness of tests to simulate such behaviours associated with the destructiveness of the structure failure, makes the retrieving of failure mechanisms from the debris very complex.

For metallic airframes, stress release and redistribution are intrinsically provided by local plastic deformations and failure occurs by yielding of the skin or by local/global stiffener buckling. Local plasticization happens very seldom in composites, so this method of stress release is generally not available.

SUMMARY OF THE INVENTION

A first aspect of the invention provides a reinforced panel comprising:
 a composite skin;
 a plurality of stringers bonded to the skin; and
 one or more strain actuators, each positioned between an adjacent pair of stringers and configured to apply a local strain to the skin which tends to induce buckling of the skin.

A second aspect of the invention provides a method of buckling a reinforced panel, the panel comprising a composite skin and a plurality of stringers bonded to the skin, the method comprising:
 applying a load to the panel in the plane of the skin; and
 applying a local strain to the skin between an adjacent pair of stringers with one or more strain actuators when the load exceeds a predetermined threshold.

The invention recognises that the tension release similar to that which results from local plastic deformation of a metal structure can be achieved in a composite structure by inducing early buckling in the skin.

The load which is applied in the plane of the skin may be compressive load, shear load, or a combination of the two.

In one embodiment each strain actuator applies the local strain by changing its geometry between two stable states. In this case each strain actuator may change its geometry automatically without requiring a control system. In other embodiments a control system is provided to monitor strain of the skin and drive the strain actuators when the monitored strain exceeds a predetermined threshold. The strain actuators in this case may for example be piezoelectric devices. The use of a control system for active control and monitoring can enhance the operating load range and provide information on actual structure configuration, behaviour and integrity.

An array of dedicated strain gauges may provide the necessary input to the control system. However more preferably the actuators provide the required sensing input—that is, each actuator is configured to sense the strain of the skin and generate a sensing signal which is monitored by the control system. This reduces the number of control lines required, since each actuator can both transmit sensing signals to the control system and receive drive signals from the control system via a common two-way control line.

The stringers and skin may be bonded together by an adhesive, by co-curing, or by any other suitable bonding method.

The strain actuators may be at least partially embedded in the skin. This may remove the requirement of an adhesive for bonding the strain actuators to the skin.

In the embodiments described herein, the skin is formed from a composite material comprising a plurality of uni-axial carbon-fibres which are impregnated with epoxy resin. However the skin may be formed from any composite material, including for instance glass-reinforced fibre metal laminate (GLARE).

BRIEF DESCRIPTION OF THE DRAWINGS

Embodiments of the invention will now be described with reference to the accompanying drawings, in which:
FIG. 1 is a plan view of a reinforced panel according to an embodiment of the invention;
FIG. 2 is a cross-section taken along a line A-A in FIG. 1.

DETAILED DESCRIPTION OF EMBODIMENT(S)

Figure 3:
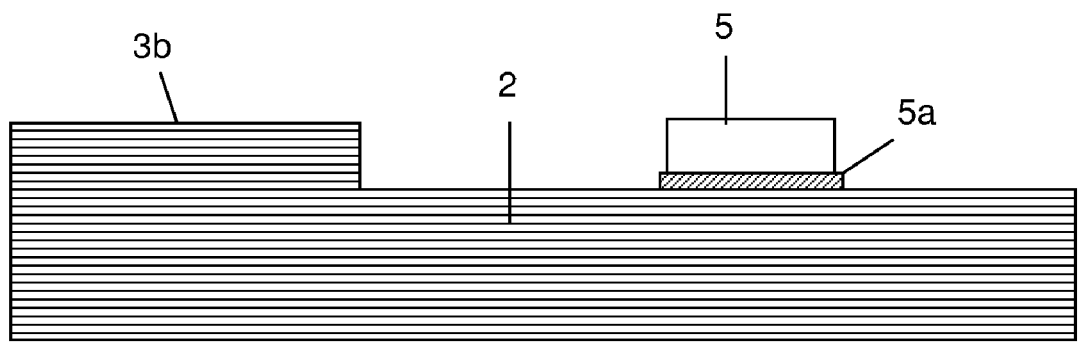
FIG. 3 is an enlarged cross-sectional view of part of the panel.

A portion of a reinforced panel 1 is shown in FIGS. 1 and 2. The panel may form, for example, the skin of an aircraft wing or fuselage. The panel comprises a composite skin 2; a plurality of composite stringers 3,4 co-cured to the skin; and a two-dimensional array of piezoelectric strain actuators 5 positioned between the stringers. In the case of an aircraft wing, the stringers run in a span-wise direction from the root of the wing towards its tip.

FIG. 1 shows only a small portion of the panel, which extends further in both the horizontal and vertical directions. As shown in FIG. 2, each stringer comprises a web 3a,4a extending from the skin and a pair of flanges 3b,4b which are bonded to the skin 2.

Figure 4:
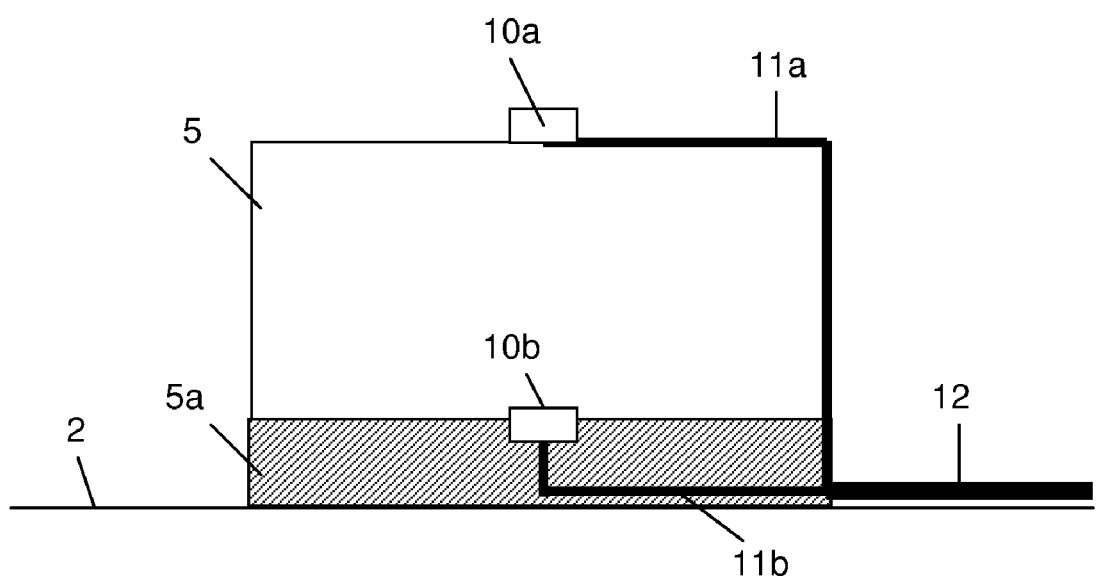
FIG. 4 is a enlarged view of one of the actuators.
Figure 5:
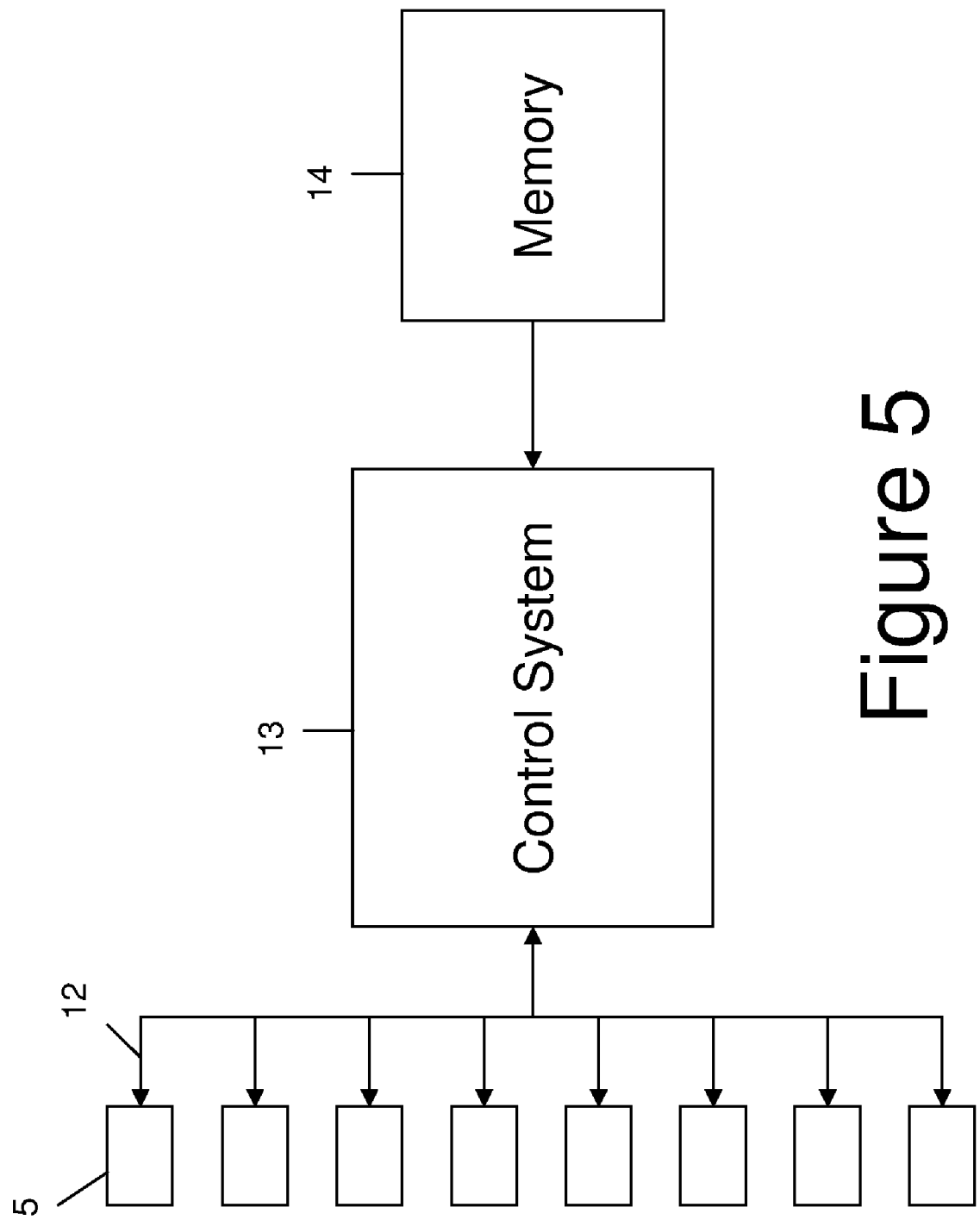
FIG. 5 shows the electronic control system.

Each strain actuator 5 is bonded to the skin 1 by an adhesive layer 5a shown in FIGS. 3 and 4. A pair of electrodes 10a and 10b are bonded to the upper and lower faces of the actuator. Each electrode is connected to a respective control line 11a, 11b and the control lines are bundled together in a cable 12 which leads to a control system 13 shown in FIG. 5.

The control system 13 drives the actuators by applying a voltage between the electrodes 10a,10b. This causes the actuator to either expand or contract at right angles to the electric field due to the piezoelectric effect. The sign of the voltage determines whether the actuator expands or contracts.

The strain actuators 5 also act as load sensors. When the panel deforms, this causes the strain actuators to expand or contract which, in turn, generates a voltage between the electrodes 10a,10b. This voltage provides a sensing signal which is monitored by the control system 13. The control system 13 generates a drive signal when the monitored voltage exceeds a predetermined threshold stored in a memory 14. This drive signal either increases or decreases the voltage between the electrodes which, in turn, causes the actuator to expand or contract. Note that the sensing signal from the actuators and the drive signal to the actuators may both be carried by the same control line. Deformation of the actuator applies a local strain to the skin which causes the skin to buckle between the stringers to form wrinkles 6 shown in FIGS. 1 and 2.

Figure 10:
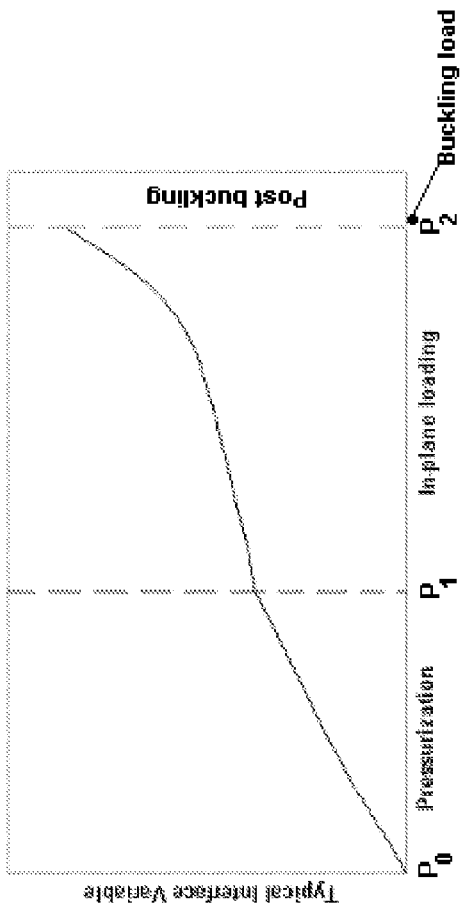
FIG. 10 is a graph of Typical Interface Variable versus load.

Currently, for the majority of aerospace structures, the requirement is that buckling is not allowed below the Design Limit Load. FIG. 10 is a graph of Typical Interface Variable (such as shear load, or out-of-lane displacement at the interface between the skin and the stringer) versus load. In the region between P1 and P2, the panel is pressurised by applying a pressure difference between the opposite faces of the panel. Such a pressure difference will exist in use due, for example, to the existence of pressurised fuel on one side of the skin. In the region between points P1 and P2 an in-plane compressive load is applied to the panel. At point P2 the panel buckles. Thus P2 represents the maximum allowed load, in the absence of strain actuators 5, and the sizing of structures is realized accordingly.

When a pre-pressurized panel reaches the buckling load, a significant change in transverse shape must occur. In fact, in the stable phase the deformed configuration (represented by one wrinkle only due to the pressure) will turn into a series of wrinkles along the stiffeners' direction in the post-buckling regime. This will happen via a snap-through phenomenon, so an abrupt change of mechanical variables will characterize the transition from the stable regime to the unstable regime. FIG. 1 illustrates three of such multiple wrinkles 6.

If the external loading acts progressively, then the internal elastic energy instantly before and after the transition must remain the same. It is intuitive that if the same amount of elastic energy is distributed over one wrinkle only or spread over several wrinkles, in the latter case the maximum out of plane displacement characterizing each wrinkle must decrease, so each interface stress component will proportionally decrease. This means that buckling induces a stress release at the interface between the panel and the stringer.

By setting the threshold in the memory 14 below the buckling load P2 (for instance 60% or 80% of the buckling load P2) the actuators 5 enforce a further stress field that tends to induce the skin to buckle before the buckling load P2 is reached. This early buckling causes a subsequent stress release at the co-bonded skin/stiffener interface. The panel will then work in a post-stable regime, and the reduced interface stresses will reach their critical value at higher load levels. As a result the operating load capability will be enhanced and a significant increase in overall performance and weight saving can be achieved.

Figure 6:
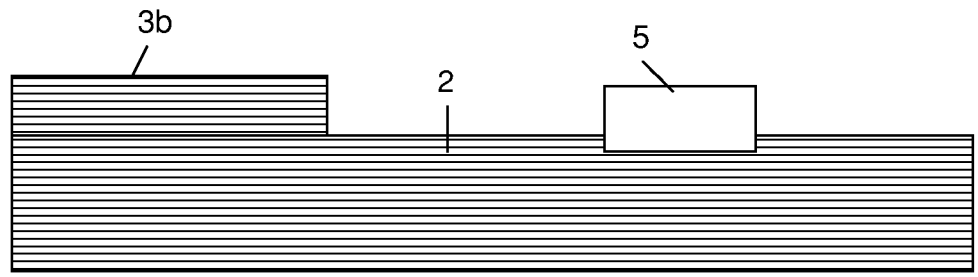
FIG. 6 shows a partially embedded actuator.
Figure 7:
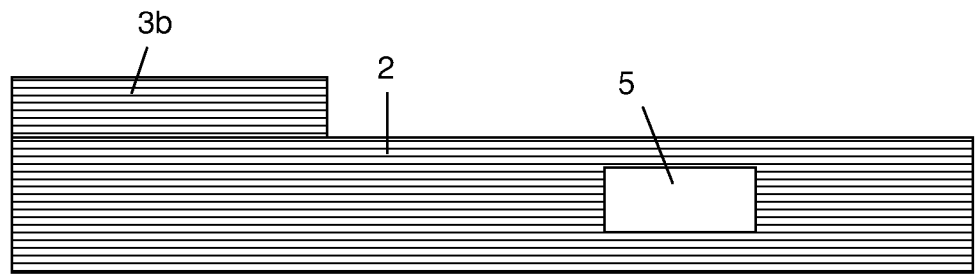
FIG. 7 shows a fully embedded actuator.
Figure 8:
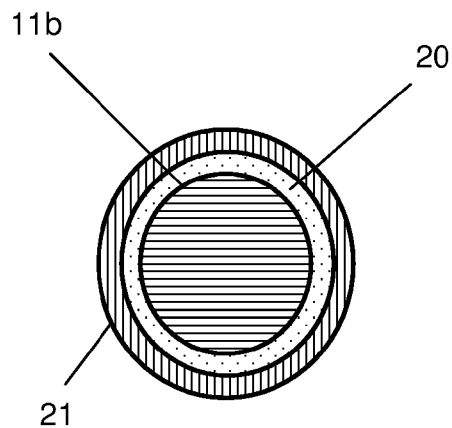
FIG. 8 is a cross-section through a fibre carrying a control line.

FIG. 6 illustrates an alternative arrangement in which the actuator 5 is partially embedded in a recess in the surface of the skin 2. FIG. 7 illustrates an alternative arrangement in which the actuator 5 is fully embedded inside the skin 2. FIG. 8 is a schematic view of the fully embedded actuator 5.

The skin 2 and stringers 3,4 are each formed from a series of composite layers, each layer comprising a plurality of uni-axial hollow carbon-fibres which are impregnated with epoxy resin. In the partially or fully embedded arrangements shown in FIGS. 6 and 7, one or both of the control lines 11a,11b may run along the hollow core of a respective carbon-fibre. This is shown in FIG. 8, which is a cross section through a hollow carbon fibre 21 containing a control line 11b in its hollow core. The space between the conductive metal control line 11b and the conductive carbon fibre 21 is filled with resin 20 which acts as an insulator.

Figure 9:
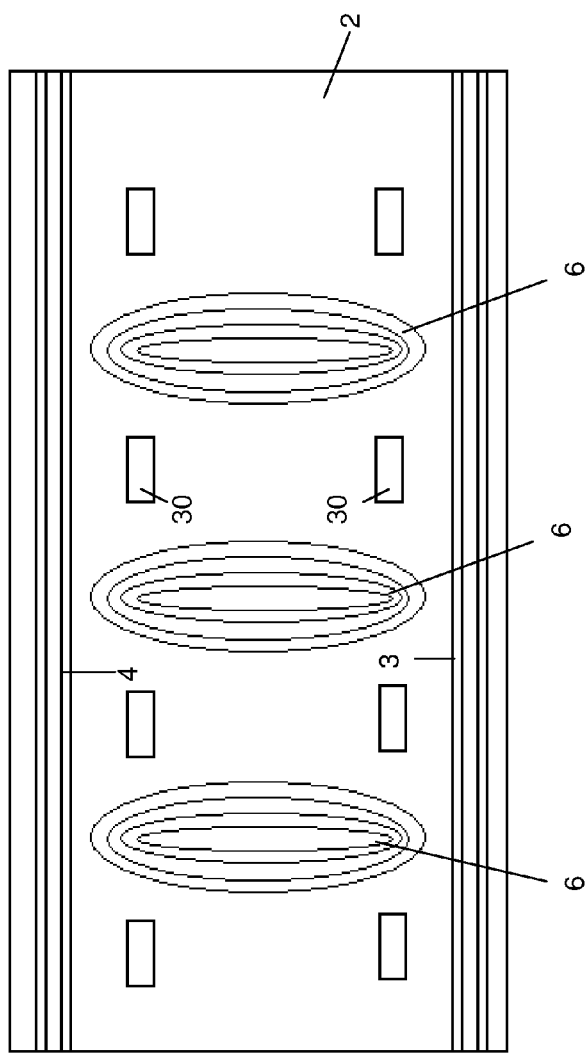
FIG. 9 is a plan view of a reinforced panel employing multi-stable actuators.

In an alternative embodiment of the invention shown in FIG. 9, the piezoelectric strain actuators 5 are replaced by multi-stable actuators 30 which apply local strain to the skin by changing their geometry between two or more stable states. An example of such a structure is an unsymmetrical laminate. Various unsymmetrical laminate structures are described in:

"The application of residual stress tailoring of snap-through composites for variable sweep wings", 47th AIAA/ASME/ASCE/AHS/ASC Structures, Structural Dynamics, and Materials Conference, 1-4 May 2006, Newport, R.I.; and Bi-stable composites with piezoelectric actuators for shape change, C. R. Bowen, A. I. T. Salo, R. Butler, E. Chang and H. A. Kim, *Key Engineering Materials Vols.* 334-335 (2007) pp. 1109-1112

The simplest example is a square plate with a stacking sequence of [0°/90°]. After cool down, the plate which is cured flat at high temperature, shows a cylindrical shape that can be easily snapped into a second cylindrical shape by the application of a force.

In this case no electrical control system or memory is required. Instead, the actuators 30 have an inherent material property which causes them to snap between stable states when the load in the panel exceeds a required threshold, thus causing the skin to buckle early due to the local strain applied by the actuators 30.

Although the invention has been described above with reference to one or more preferred embodiments, it will be appreciated that various changes or modifications may be made without departing from the scope of the invention as defined in the appended claims.

The invention claimed is:

1. A reinforced panel comprising:
    a composite skin;
    a plurality of stringers bonded to the skin; and
    one or more strain actuators, each positioned between an adjacent pair of stringers and configured to apply a local strain to the skin which tends to induce buckling of the skin.

2. The panel of claim 1 further comprising a control system configured to monitor strain of the skin and drive the strain actuators when the monitored strain exceeds a predetermined threshold.

3. The panel of claim 2 wherein each actuator is configured to sense the strain of the skin and generate a sensing signal which is monitored by the control system.

4. The panel of claim 3 wherein each actuator transmits sensing signals to the control system and receives drive signals from the control system via a common two-way control line.

5. The panel of claim 1 wherein each strain actuator applies the local strain by changing its geometry between two stable states.

6. The panel of claim 1 wherein the stringers and skin are co-cured.

7. The panel of claim 1 wherein each strain actuator is bonded to the skin by an adhesive layer.

8. The panel of claim 1 wherein each strain actuator is at least partially embedded in the skin.

9. The panel of claim 1 wherein each strain actuator is a piezoelectric device.

10. The panel of claim 1 wherein the skin is formed from a laminar composite material.

11. A method of buckling a reinforced panel, the panel comprising a composite skin and a plurality of stringers bonded to the skin, the method comprising:

applying a compressive load to the panel in the plane of the skin; and applying a local strain to the skin between an adjacent pair of stringers with one or more strain actuators when the load exceeds a predetermined threshold.

12. The method of claim 11 further comprising monitoring the strain of the skin, and driving the strain actuators when the monitored strain exceeds the predetermined threshold.

13. The panel of claim 1 wherein the one or more strain actuators are configured to apply a local strain to the skin which causes the skin to buckle between the stringers to form a series of several wrinkles in the skin.

14. The panel of claim 13 wherein the actuators are configured such that the wrinkles are spaced apart from each other along the stiffeners' direction.

15. The method of claim 11 wherein the one or more strain actuators apply a local strain to the skin which causes the skin to buckle between the stringers to form a series of several wrinkles in the skin.

16. The method of claim 15 wherein the wrinkles are spaced apart from each other along the stiffeners' direction.

\* \* \* \* \*